(12) United States Patent
Sharff

(10) Patent No.: US 10,046,475 B2
(45) Date of Patent: Aug. 14, 2018

(54) MACHINING DEVICE AND METHOD FOR PRODUCING A MASTER-PIECE DUPLICATING MACHINE

(71) Applicant: Aharon Sharff, Zichron Yaakov (IL)

(72) Inventor: Aharon Sharff, Zichron Yaakov (IL)

(*) Notice: Subject to any disclaimer, the term of this patent is extended or adjusted under 35 U.S.C. 154(b) by 280 days.

(21) Appl. No.: 15/058,187

(22) Filed: Mar. 2, 2016

(65) Prior Publication Data
US 2017/0252942 A1 Sep. 7, 2017

(51) Int. Cl.
*B27C 5/00* (2006.01)

(52) U.S. Cl.
CPC .................................. *B27C 5/003* (2013.01)

(58) Field of Classification Search
CPC ........ B23Q 35/00; B23Q 35/02; B23Q 35/04; B23Q 35/08; B23Q 35/10; B27C 5/003; B23D 61/02; B27L 31/00; B27L 31/002; B27L 31/005; B27L 31/007
USPC .......................................................... 83/565
See application file for complete search history.

(56) References Cited

U.S. PATENT DOCUMENTS

| | | | | |
|---|---|---|---|---|
| 3,751,856 A | * | 8/1973 | Jorgensen | B24B 17/02 451/236 |
| 3,865,162 A | * | 2/1975 | Schmidt | B23Q 35/105 144/134.1 |
| 6,095,726 A | * | 8/2000 | Scott | B23D 61/025 144/144.1 |
| 6,450,220 B2 | * | 9/2002 | Domask | B23Q 9/0085 144/137 |
| 7,677,149 B2 | * | 3/2010 | Hogan | B26D 3/10 83/451 |

* cited by examiner

*Primary Examiner* — Matthew G Katcoff
(74) *Attorney, Agent, or Firm* — Alphapatent Associates, LTD; Daniel J. Swirsky

(57) ABSTRACT

A machining device, including: a cart, for carrying a master-piece and a work-piece; a rail, for allowing manual sliding of the cart along the rail thereabove; a first vice for securing the master-piece, the first vice being fixed to the movable cart; a second vice for securing the work-piece, the second vice being fixed to the movable cart; a limiting element, for limiting the manual sliding of the cart upon meeting of the master-piece with the limiting element; and a protrusion including at least two points extending downwards from the rail; thereby the machining device utilizes parallelism between the channel and a cutting blade of the table saw.

6 Claims, 10 Drawing Sheets

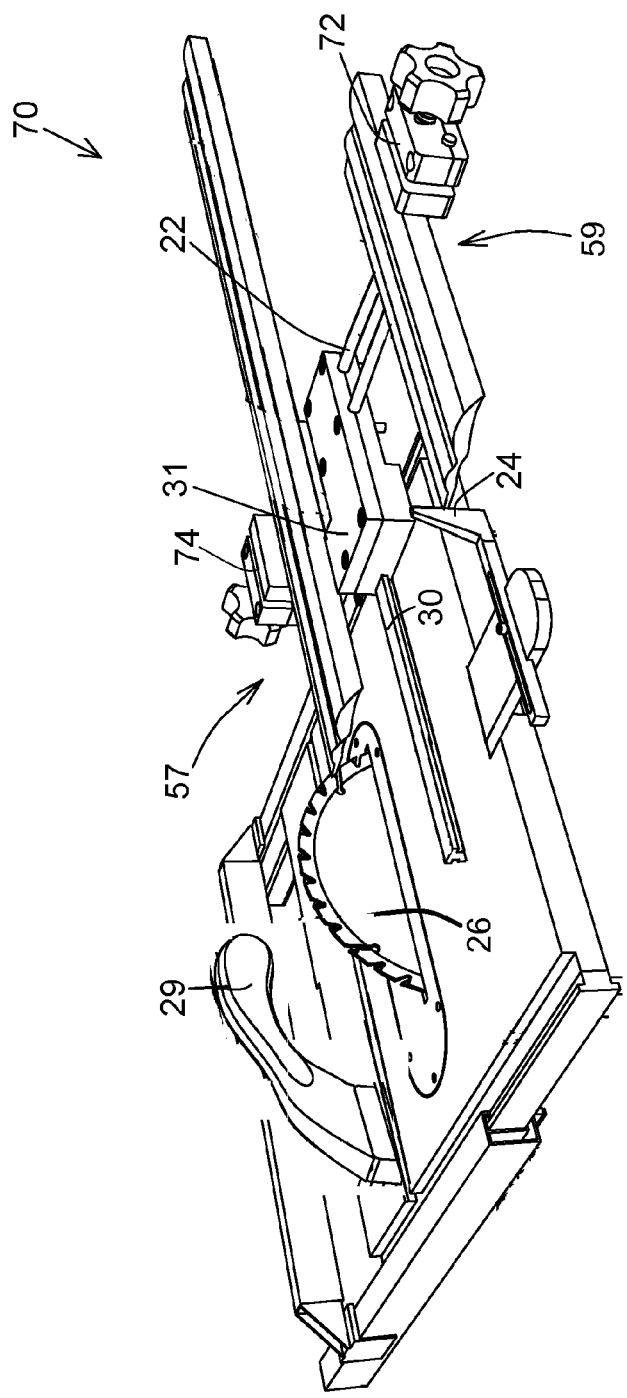
FIG 1 - PRIOR ART

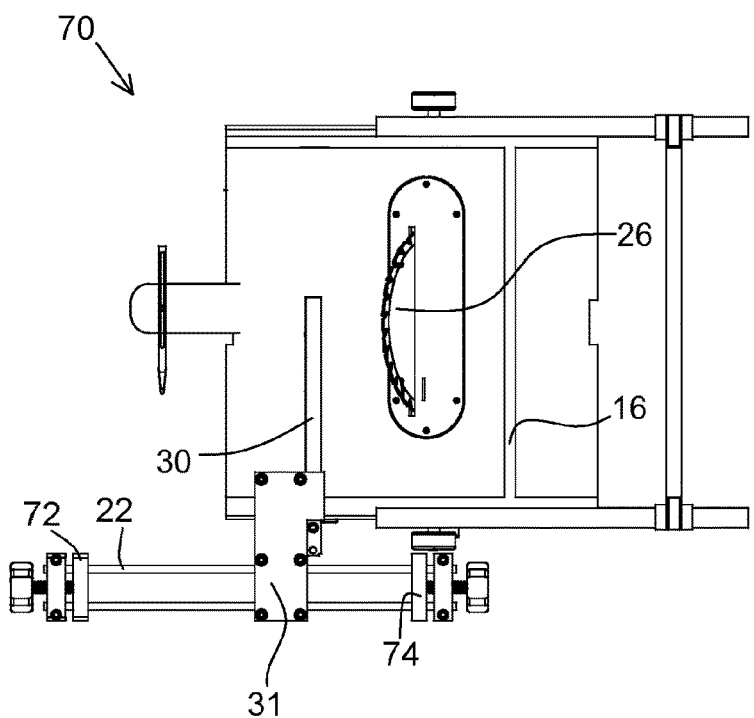
FIG 2 - PRIOR ART
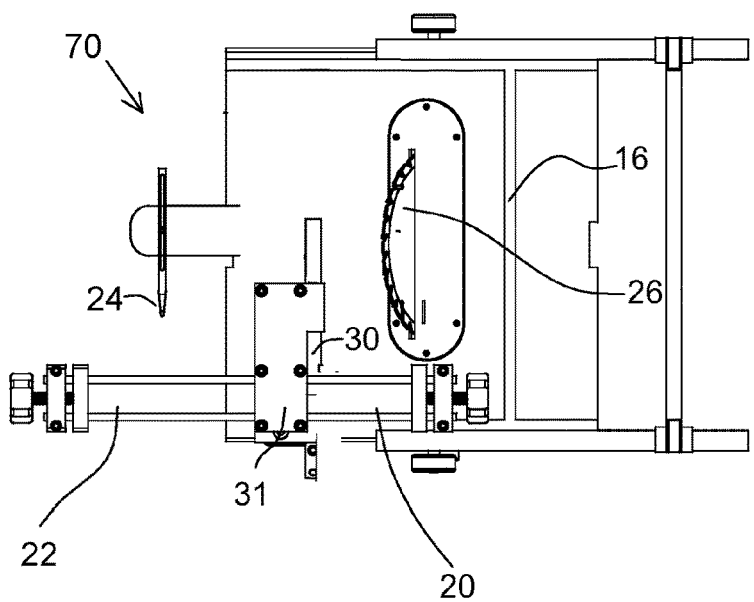
FIG 3 - PRIOR ART

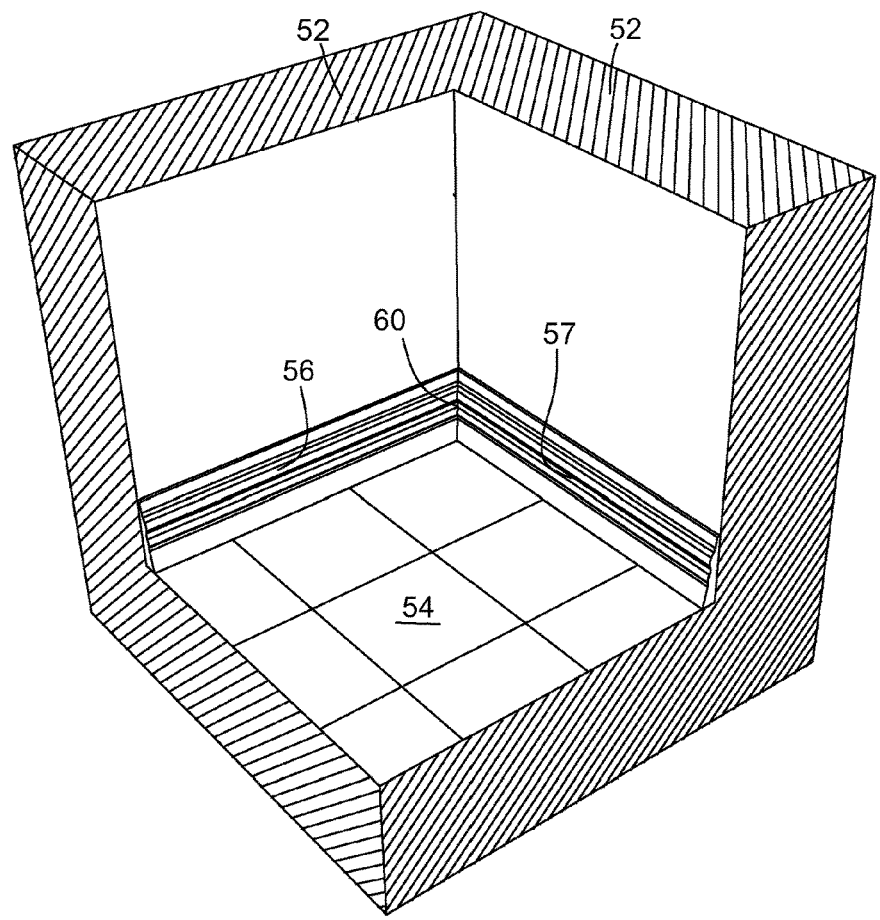
FIG 4 - PRIOR ART
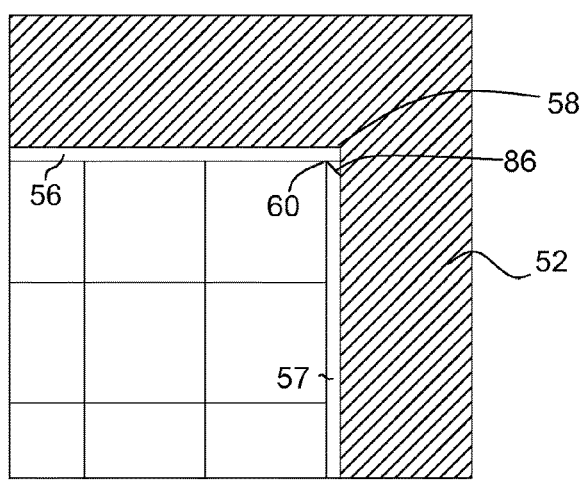
FIG 5 - PRIOR ART

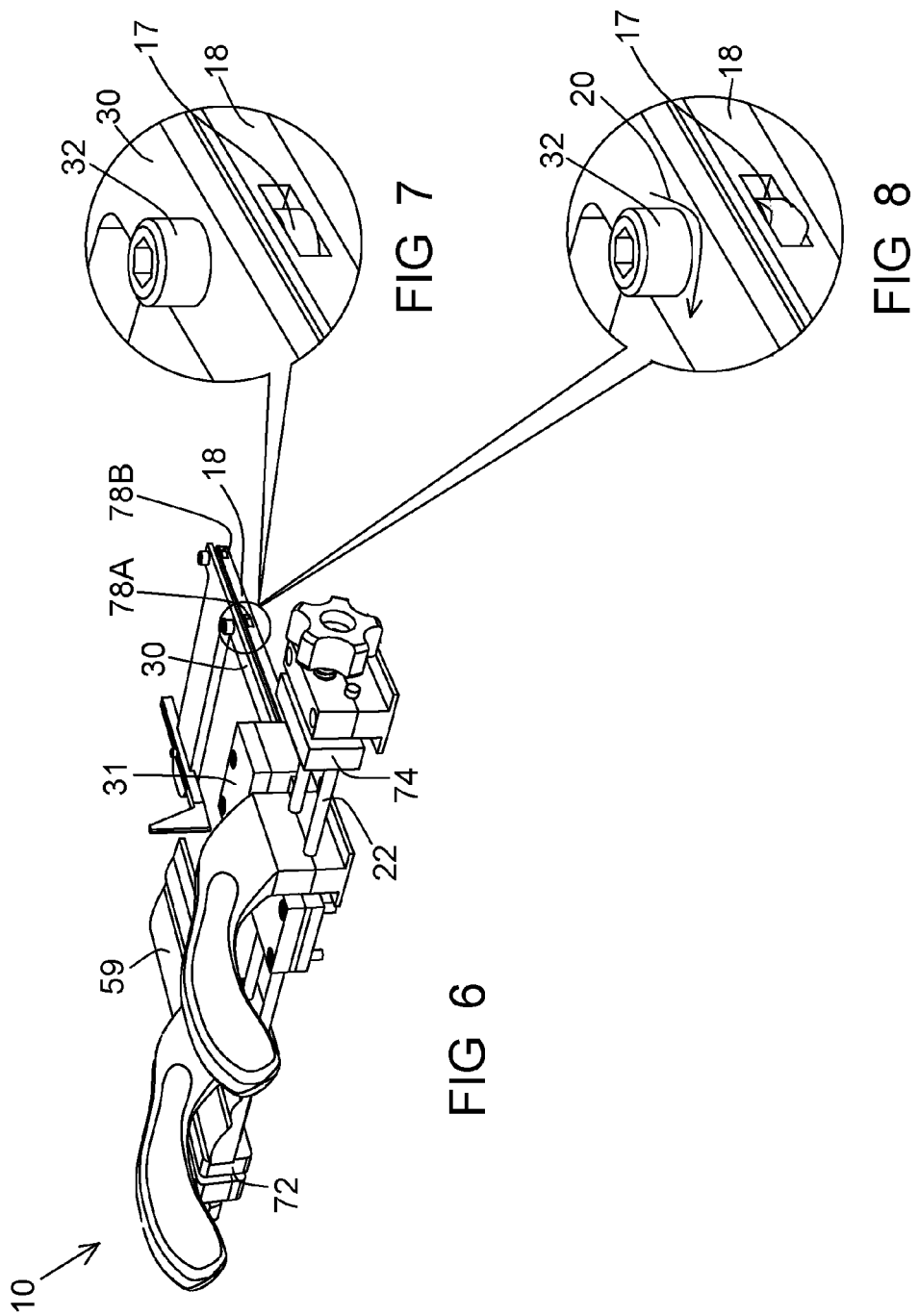

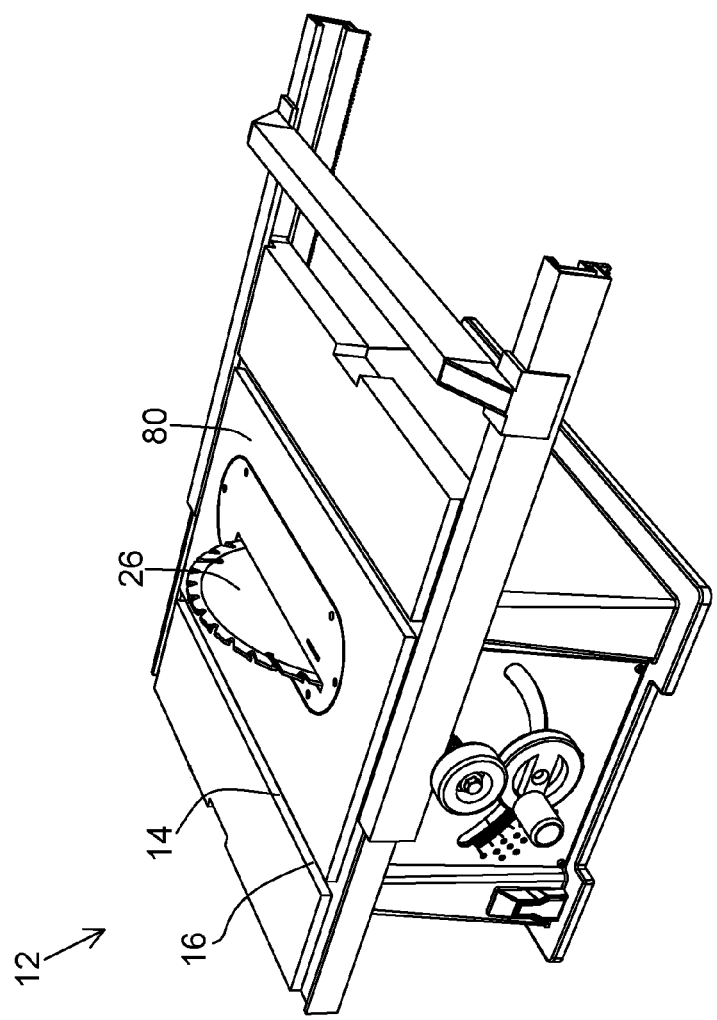
FIG 9 - PRIOR ART

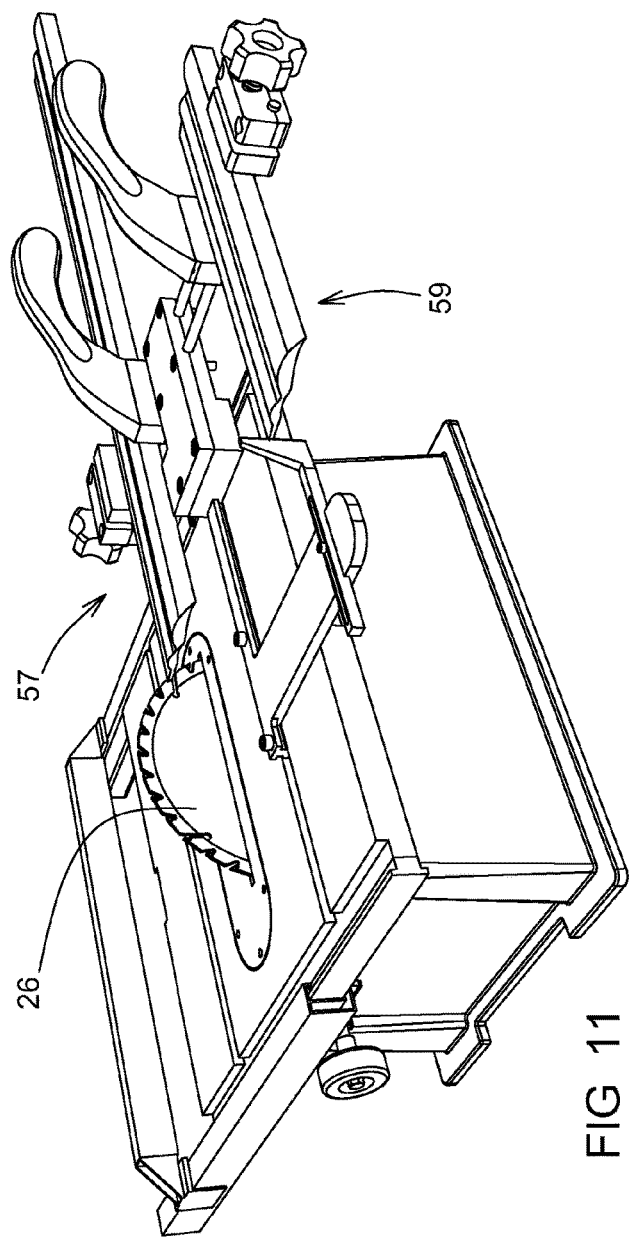
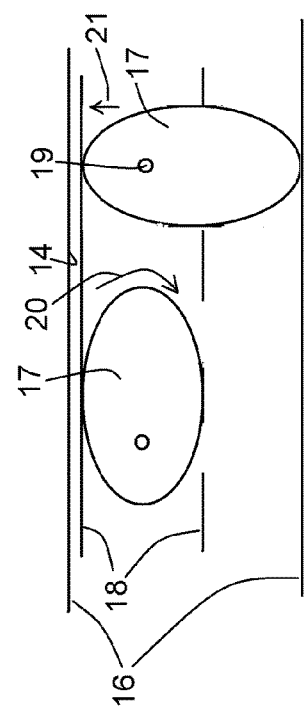
FIG 11
FIG 12

MACHINING DEVICE AND METHOD FOR PRODUCING A MASTER-PIECE DUPLICATING MACHINE

TECHNICAL FIELD

The invention relates to the field of machining. More particularly, the invention relates to a method and apparatus for producing a master-piece duplicating machine.

BACKGROUND

FIG. 1 is a perspective view of a prior art master-piece duplicating machine.

Prior art master-piece duplicating machine 70, such as disclosed by U.S. Pat. No. 6,095,726, includes a first vice 72, for securing a master-piece 59 for copying therefrom; and a second vice 74 for securing a work-piece 57, for cutting thereof by a cutting blade 26.

Master-piece duplicating machine 70 allows moving work-piece 57 according to the shape of master-piece 59, for shaping work-piece to the shape of master-piece 59.

FIG. 2 is a top view of the prior art master-piece duplicating machine of FIG. 1.

The motion is obtained by securing master-piece 59 and work-piece 57 to a shared cart 31.

Cart 31 is slideable in relation to a rail 30, being parallel to cutting blade 26.

Conventionally, cart 31, master-piece 59 and work-piece 57 are stationary in relation to the ground, and cutting blade 26 together with rail 30 slide in relation to the cart 31 and the ground.

Cart 31 includes a rail 22 being disposed perpendicularly to rail 30, for allowing sliding work-piece 57 and master-piece 59 perpendicularly to rail 30.

FIG. 3 is the top view of FIG. 2, except that the cart is disposed in a different location.

Moving of cutting blade 26, as depicted in FIG. 3, induces the cutting of work-piece 57 (shown in FIG. 1).

The professional presses the end of master-piece 59 towards a limiting element 24, thus master-piece 59 can be moved as a function of the shape of master-piece 59.

However, prior art master-piece duplicating machine 70, is cumbersome for the user to carry it to the job site.

FIG. 4 is a perspective view of a corner, for depicting an example of a working site where the prior art master-piece duplicating machine of FIG. 1 is required.

There is a need for creating a perfect joint between profiles 57 and 56, disposed at a corner 60 of two walls 52.

FIG. 5 depicts a well-known technique for fitting the end shape of profiles of FIG. 4 one to the other to join one another.

A cut 86 is applied to profile 57, for providing that corner 60 is indeed a point only for various angles between walls 52, for eliminating the need to fit corners of the profiles one to the other. By profile coping, the end cut of profile 57 further is formed to fit the three-dimensional shape of the face of profile 56. Thus, profile 57 is herein named "work-piece".

However, prior art master-piece duplicating machine 70, as being a stationary machine, for being located in a carpentry shop, is not convenient for this cutting of work-piece 57, being located at the working site.

The invention provides a solution to the above-mentioned and other problems of the prior art.

SUMMARY

In one aspect, the invention is directed a machining device, including:
a cart, for carrying a master-piece and a work-piece;
a rail, for allowing manual sliding of the cart along the rail thereabove;
a first vice for securing the master-piece, the first vice being fixed to the movable cart;
a second vice for securing the work-piece, the second vice being fixed to the movable cart;
a limiting element, for limiting the manual sliding of the cart upon meeting of the master-piece with the limiting element; and
means for connecting the rail to a table saw, parallel to a cutting blade of the table saw, in a removable manner, thereby the manual sliding of the cart along the rail moves the master-piece and the work-piece parallel to the cutting blade,
thereby the limiting of the manual sliding by the limiting element of the machining device, allows the cutting blade of the table saw to cut the work-piece while duplicating the master-piece.

The end shape of the workpiece may thus be formed to fit the three-dimensional shape of the profile, by profile coping.

BRIEF DESCRIPTION OF THE DRAWINGS

Embodiments, features, and aspects of the invention are described herein in conjunction with the following drawings:

FIG. 1 is a perspective view of a prior art master-piece duplicating machine.

FIG. 2 is a top view of the prior art master-piece duplicating machine of FIG. 1.

FIG. 3 is the top view of FIG. 2, except that the cart is disposed in a different location.

FIG. 4 is a perspective view of a corner, for depicting an example of a working site where the prior art master-piece duplicating machine of FIG. 1 is required.

FIG. 5 depicts a well-known technique for fitting the profiles of FIG. 4.

FIG. 6 is a work-piece duplicating device, according to one embodiment of the invention.

FIG. 7 is a magnification of the securing assembly of the rail of the work-piece duplicating device of FIG. 6.

FIG. 8 is a perspective view of the securing assembly of FIG. 7, upon operating the securing assembly, even not secured, since there is no assembly to be secured to.

FIG. 9 depicts a prior art table saw, for which the work-piece duplicating device of FIG. 6 is designed.

FIG. 11 depicts FIG. 10 from another angle of view.

FIG. 12 is a top view of the securing assemblies in the positions of FIGS. 7 and 8, for securing thereof to the channel of FIGS. 9 and 10.

Figure 10:
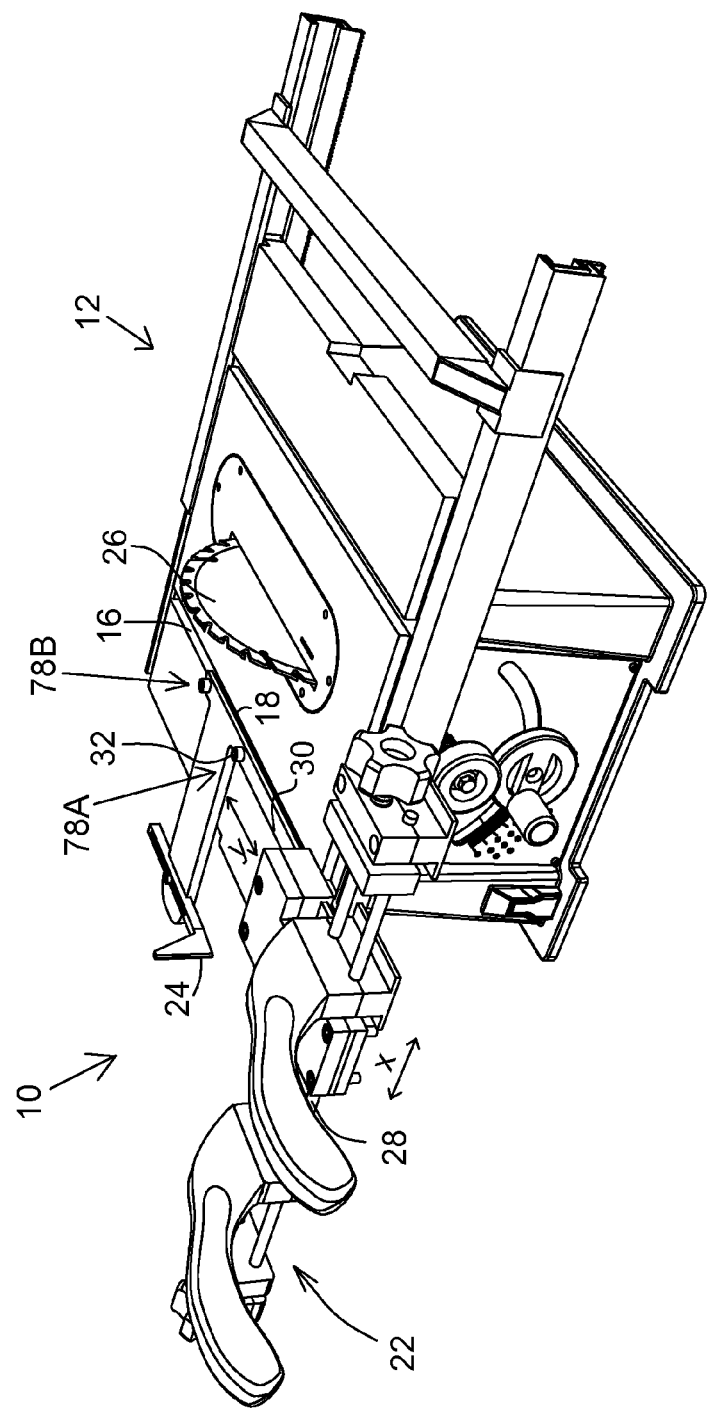
FIG. 10 depicts the work-piece duplicating device of FIG. 6, being secured to the prior art table saw of FIG. 9.

The drawings are not necessarily drawn to scale.

DETAILED DESCRIPTION

The invention will be understood from the following detailed description of embodiments of the invention, which are meant to be descriptive and not limiting. For the sake of brevity, some well-known features, methods, systems, procedures, components, and so on, are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

FIG. 6 is a work-piece duplicating device, according to one embodiment of the invention.

A machining device 10 constituting a work-piece duplicating device, according to one embodiment of the invention includes first vice 72, for securing master-piece 59 for copying therefrom; and second vice 74 for securing work-piece 57 (not shown), for cutting thereof.

Work-piece duplicating device 10 allows providing work-piece 57 with an identical motion as of master-piece 59.

The end shape of work-piece 57 is may thus fitted to the three-dimensional shape of profile 56 of FIG. 5, by profile coping.

The identical motion is obtained by resting master-piece 59 and work-piece 57 on a shared cart 31. Cart 31 is slideable along a rail 30.

Cart 31 includes a rail 22 being disposed perpendicularly to rail 30, for allowing sliding work-piece 57 and master-piece 59 perpendicularly to rail 30.

Work-piece duplicating device 10 includes a limiting element 24, thus master-piece 59 can be moved as a function of the shape of master-piece 59.

A protrusion 18 extends from rail 30 downwards.

The term "point" refers herein to a point having an extent.

Protrusion 18 includes at least two points, namely 78A and 78B, each constituting a securing assembly. Points 78A and 78B together define a line below rail 30. Protrusion 18 may be longitudinal, as depicted in the figure.

FIG. 7 is a magnification of the securing assembly of the rail of the work-piece duplicating device of FIG. 6.

Each of securing assemblies 78A and 78B includes securing means 17, which may be operable by a screw 32, which may be disposed above rail 30, being accessible to the professional.

FIG. 8 is a perspective view of the securing assembly of FIG. 7, upon operating the securing assembly, even not secured, since there is no assembly to be secured to.

According to one embodiment securing means 17 constitutes an eccentric lump, for rotating it by screw 32, for making lump 17 protrude.

FIG. 9 depicts a prior art table saw, for which the work-piece duplicating device of FIG. 6 is designed.

A conventional prior art table saw 12 includes a cutting blade 26 extending from a table 80. Table 80 normally includes one or more channels 16, extending along table 80, which are disposed accurately parallel to cutting blade 26.

FIG. 10 depicts the work-piece duplicating device of FIG. 6, being secured to the prior art table saw of FIG. 9.

FIG. 11 depicts FIG. 10 from another angle of view.

Work-piece duplicating device 10 is intended to be secured to prior art table saw 12, by inserting protrusion 18 of work-piece duplicating device 10 into channel 16 of prior art table saw 12; and then by operating securing assemblies 78A and 78B.

FIG. 12 is a top view of the securing assemblies in the positions of FIGS. 7 and 8, for securing thereof to the channel of FIGS. 9 and 10.

Upon rotating the left eccentric lump 17 of the figure about an eccentric hinge 19 as indicated by arrow 20, to the position of the right eccentric lump 17 in the figure, such as by screw 32 (shown in FIG. 8), lump 17 protrudes out of protrusion 18, and thus presses protrusion 18 towards wall 14 of channel 16, as indicated by arrow 21.

Friction force between wall 14 of channel 16 of prior art table saw 12 and protrusion 18 of rail 30 of work-piece duplicating device 10 secures work-piece duplicating device 10 to prior art table saw 12 in a position that rail 30 of work-piece duplicating device 10 is accurately parallel to cutting blade 26 of prior art table saw 12.

Figure 13:
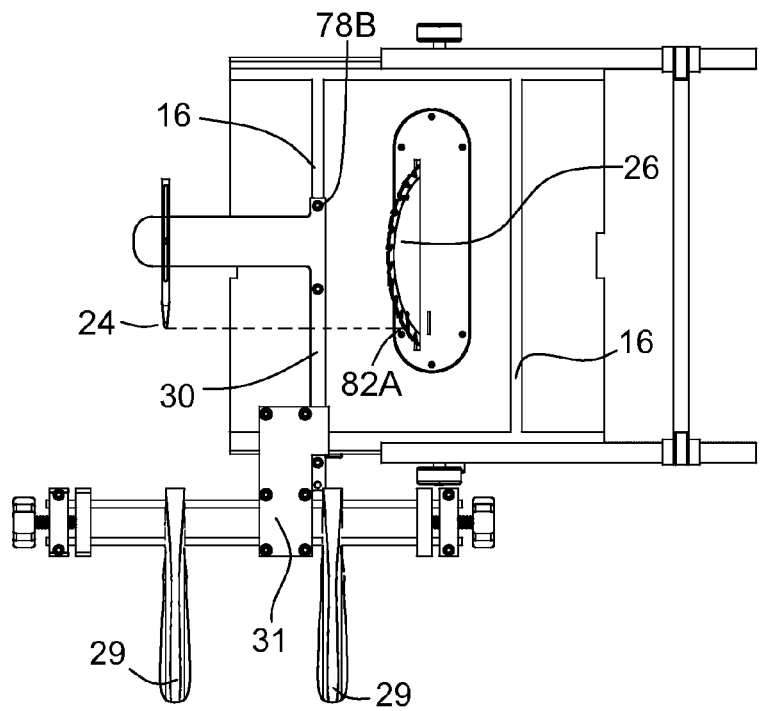
FIG. 13 is a top view of the work-piece duplicating device of FIG. 6, being secured to the prior art table saw of FIG. 9.

FIG. 13 is a top view of the work-piece duplicating device of FIG. 6, being secured to the prior art table saw of FIG. 9.

Cart 31 of work-piece duplicating device 10 is slideable along rail 30, protrusion thereof 18 (not shown) of work-piece duplicating device 10 being inserted into channel 16 of prior art table saw 12, being parallel to cutting blade 26.

Figure 14:
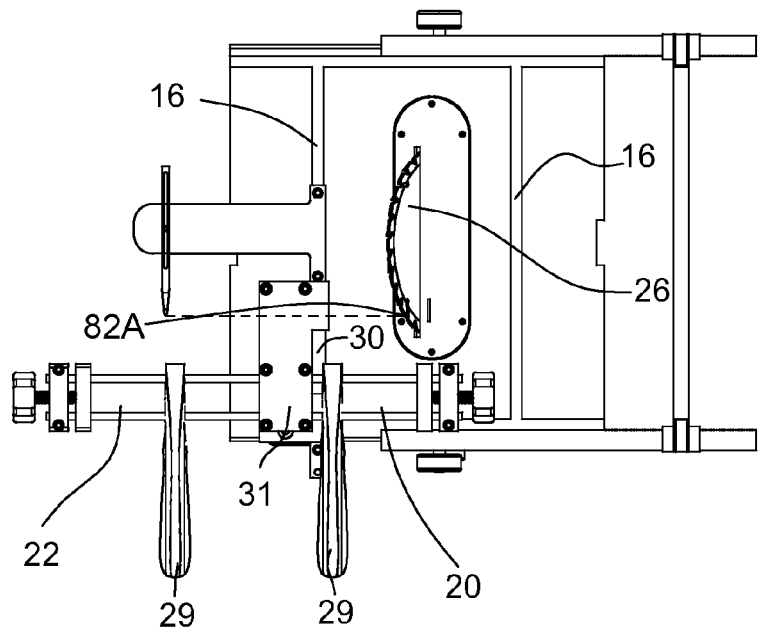
FIG. 14 is the top view of FIG. 13, except that the cart is disposed in a different location.

FIG. 14 is the top view of FIG. 13, except that the cart is disposed in a different location.

Pressing on handles 29 towards cutting blade 26, as depicted in FIG. 14, induces the cutting of work-piece 57 (shown in FIG. 11).

The professional presses the end of master-piece 59 towards a limiting element 24, thus master-piece 59 can be moved as a function of the shape of master-piece 59.

Figure 15:
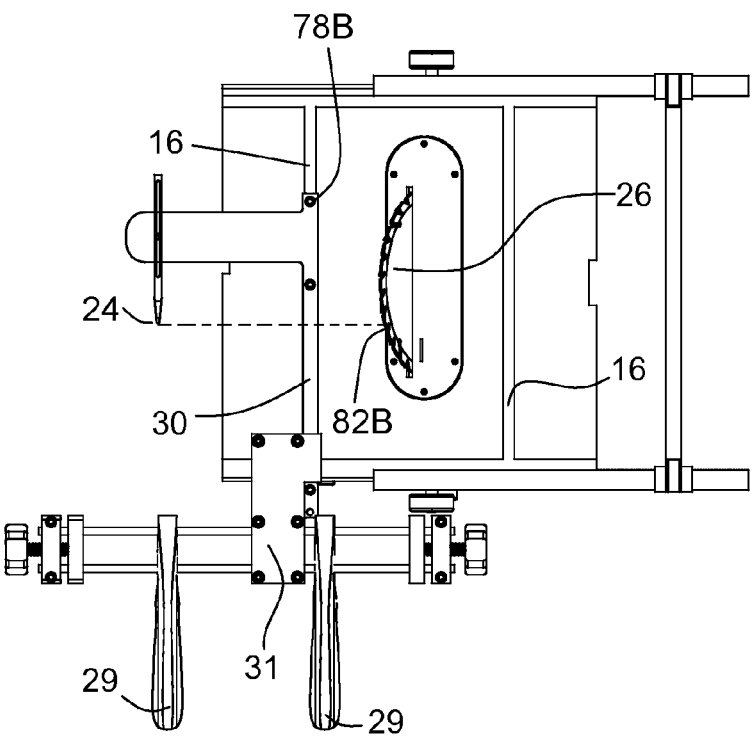
FIG. 15 is the top view of FIG. 13, except that the work-piece duplicating device is disposed in a different location, in relation to the prior art work-piece duplicating device.

FIG. 15 is the top view of FIG. 13, except that the work-piece duplicating device is disposed in a different location, in relation to the prior art work-piece duplicating device.

Channel 16 of prior art table saw 12 is uniform all along, thus work-piece duplicating device 10 may be disposed and secured at any location along channel 16.

Thus, for example, in FIG. 13 limiting element 24 is disposed against a point 82A of cutting blade 26, whereas in FIG. 15 limiting element 24 is disposed against a point 82B of cutting blade 26.

Figure 16:
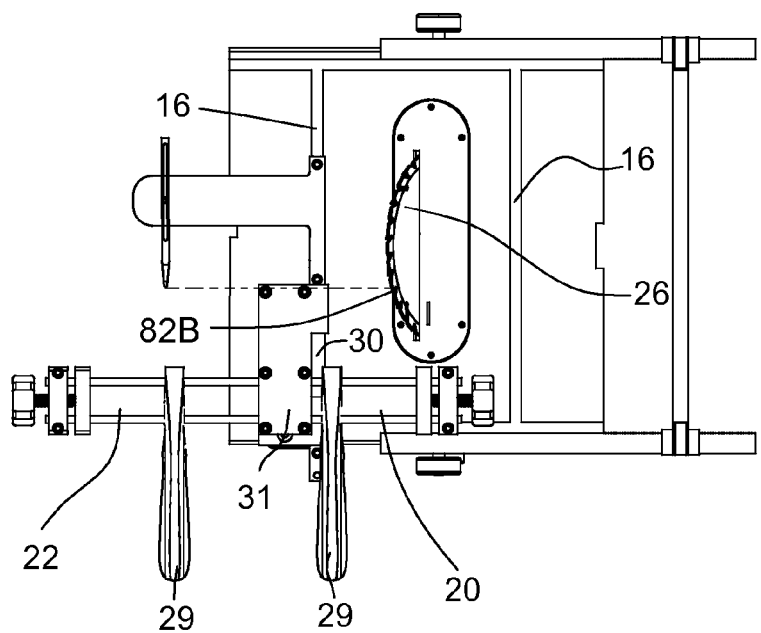
FIG. 16 is the top view of FIG. 15, except that the cart is disposed in a different location.

FIG. 16 is the top view of FIG. 15, except that the cart is disposed in a different location.

Pressing on handles 29 towards cutting blade 26, as depicted in FIG. 15, induces the cutting of work-piece 57.

Figure 17:
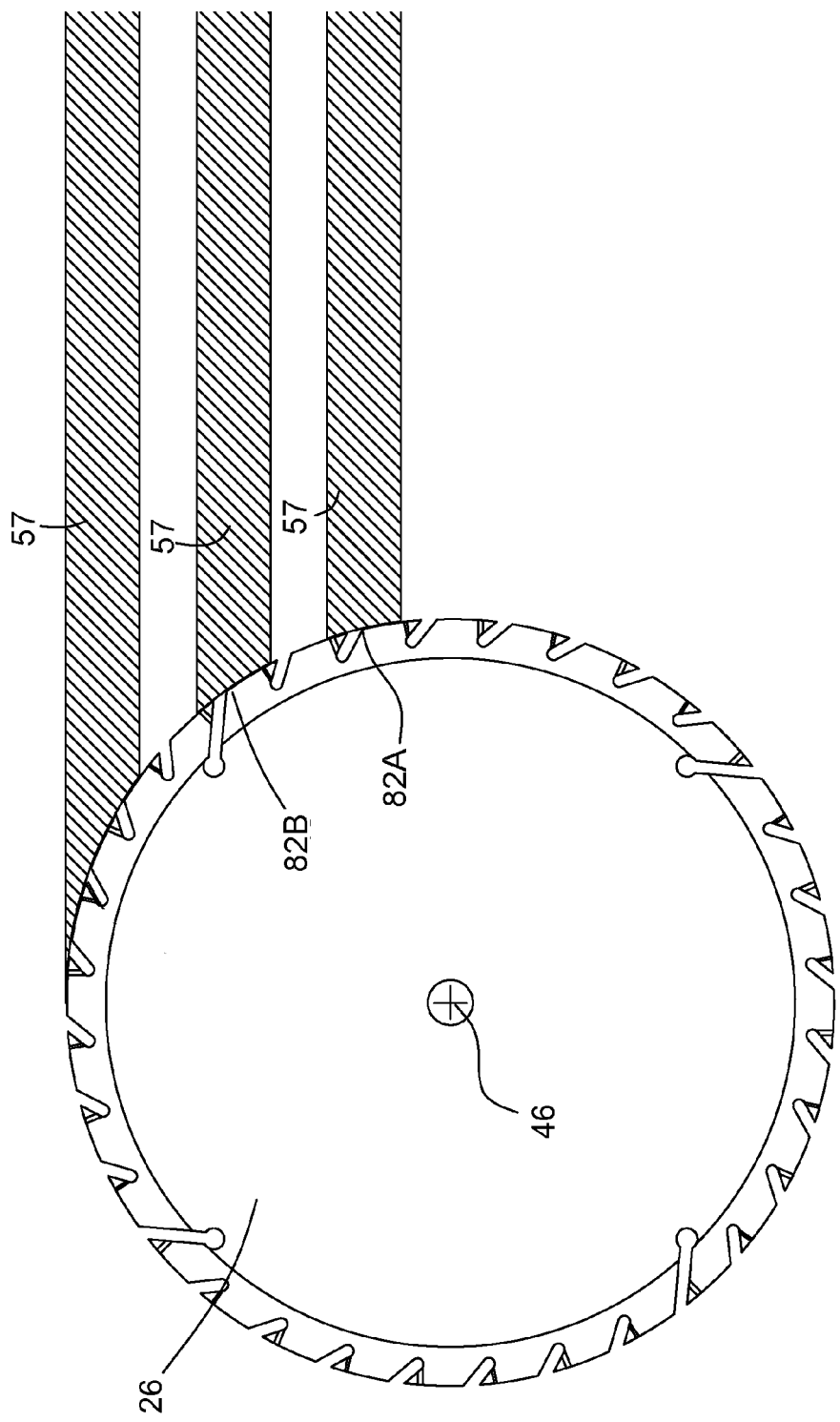
FIG. 17 depicts the master-piece of FIG. 1, being disposed on different heights in relation to the cutting blade.

FIG. 17 depicts the master-piece of FIG. 1, being disposed on different heights in relation to the cutting blade.

For example, if limiting element 24 is disposed against point 82A of cutting blade 26, then work-piece 57, being cut by cutting blade 26, is cut by point 82A of cutting blade 26; and if limiting element 24 is disposed against point 82B of cutting blade 26, then work-piece 57, being cut by cutting blade 26, is cut by point 82B of cutting blade 26.

The disposition of work-piece 57 in relation to cutting blade 26 determines the angle of the cutting.

Thus, in one aspect, the invention is directed a machining device (10), including:

a cart (31), for carrying a master-piece (59) and a work-piece (57);

a first rail (30), for allowing manual sliding of the cart (31) along the first rail (30) thereabove;

a first vice (72) for securing the master-piece (59), the first vice being fixed to the movable cart (31);

a second vice (74) for securing the work-piece (57), the second vice (74) being fixed to the movable cart (31);

a limiting element (24), for limiting the manual sliding of the cart (31) upon meeting of the master-piece (59) with the limiting element (24); and means (18) for connecting the first rail (30) to a table saw (12), parallel to a cutting blade (26) of the table saw (12), in a removable manner, thereby the manual sliding of the cart (31) along the first rail (30) moves the master-piece (59) and the work-piece (57) parallel to the cutting blade (26), thereby the limiting of the manual sliding by the limiting element (24) of the machining device (10), allows the cutting blade (26) of the table saw (12) to cut the work-piece (57) while duplicating the master-piece (59).

The machining device (10) may further include:

a second rail (22) being disposed perpendicularly to the first rail (30), for allowing sliding the cart (31) perpendicularly to the first rail (30), thereby allowing moving the work-piece (57) perpendicular to the cutting blade (26), for cutting, thereby allowing coping the work-piece (57).

The means (18) for connecting the first rail (30) to the table saw (12) may include:

a protrusion (18) including at least two points (78A, 78B) extending downwards from the first rail (30);

wherein the protrusion (18) is shaped for inserting thereof into a channel (16) of a table (80) of a table saw (12), thereby the machining device (10) utilizes parallelism between the channel (16) and the cutting blade (26) of the table saw (12) in that upon applying the inserting, the manual sliding of the cart (31) along the first rail (30) moves the master-piece (59) and the work-piece (57) parallel to the cutting blade (26).

At least one of the at least two points (78A, 78B) extending downwards from the first rail (30) may include a securing assembly (78A) characterized for securing the protrusion (18) of the machining device (10) to the channel (16) of the table saw (12).

The securing assembly (78A) may include an eccentric lump (17), for allowing it to protrude from the protrusion (18) upon rotating the eccentric lump (17), thereby pressing the protrusion (18) towards a wall (14) of the channel (16), thereby the pressing provides friction force between the protrusion (18) and the channel (16) for securing one to the other.

The securing assembly (78A) may be characterized in allowing the securing of the protrusion (18) of the machining device (10) to the channel (16) of the table saw (12) in various locations along the channel (16).

The securing assembly (78A) may include a screw (32) for operating the securing assembly (78A), the screw being disposed above the first rail (30), for being accessible.

In another aspect, the invention is directed to a method for producing a master-piece duplicating machine (70), the method including the steps of:

a) providing a machining device (10) including:
a cart (31);
a rail (30), for allowing manual sliding of the cart (31) along the rail (30) thereabove;
a first vice (72) for securing a master-piece (59), the first vice being fixed to the movable cart (31);
a second vice (74) for securing a work-piece (57), the second vice (74) being fixed to the movable cart (31); and
a limiting element (24), for limiting the manual sliding of the cart (31) upon meeting of the master-piece (59) with the limiting element (24); and
connecting means (18); and b) connecting by said connecting means (18), the rail (30) to a table saw (12), parallel to a cutting blade (26) of the table saw (12), in a removable manner, thereby the manual sliding of the cart (31) along the rail (30) moves the master-piece (59) and the work-piece (57) parallel to the cutting blade (26), thereby the limiting of the manual sliding by the limiting element (24) of the machining device (10), allows the cutting blade (26) of the table saw (12) to cut the work-piece (57) while duplicating the master-piece (59).

The step of connecting the rail (30) to the table saw (12), parallel to the cutting blade (26) of the table saw (12) may include the steps of:

inserting a protrusion (18) extending downwards from the rail (30) of the machining device (10) into a channel (16) of a table (80) of a table saw (12), thereby utilizing parallelism between the channel (16) and the cutting blade (26) of the table saw (12) in that upon applying the inserting, the manual sliding of the cart (31) along the rail (30) moves the master-piece (59) and the work-piece (57) parallel to the cutting blade (26).

The method may further include the step of:

c) securing the protrusion (18) of the machining device (10) to the channel (16) of the table saw (12).

In the figures and/or description herein, the following reference numerals (Reference Signs List) have been mentioned:

numeral 10 denotes the work-piece duplicating device, according to one embodiment of the invention;

numeral 12 denotes a prior art table saw;

numeral 14 denotes the wall of the channel of the prior art table saw;

numeral 16 denotes a channel on the prior art table saw;

numeral 17 denotes securing means, such as an eccentric lump; Once eccentric lump protrudes onto the wall of channel 16 of prior art table saw, it produces friction force between the lump and the wall;

numeral 18 denotes a protrusion of the work-piece duplicating device, for being inserted into the channel of the prior art table saw;

numeral 19 denotes an eccentric hinge;

numerals 20 and 21 denote arrows;

numeral 22 denotes a rail for the cart for sliding the cart right and left;

numeral 24 denotes a limiting element, for limiting the cart by the master-piece; the limitation limits the cutting of the work-piece;

numeral 26 denotes a cutting blade of a table saw;

numeral 29 denotes a handle for moving the cart, or for moving the cutting blade in relation to the cart;

numeral 30 denotes a rail, along which the cart may be slideable;

numeral 31 denotes the cart, carrying the master-piece and the work-piece;

numeral 32 denotes a screw for rotating the eccentric lump, for producing frictional force between the eccentric lump and the wall of the channel of the table saw;

numeral 46 denotes the center of the cutting blade;

numeral 52 denotes a wall of a room;

numeral 54 denotes the floor;

numeral 56 denotes a profile;

numeral 57 denotes a work-piece to be cut for fitting the end shape thereof to a master-piece;

numeral 59 denotes a master-piece, for duplicating the work-piece therefrom;

numeral 60 denotes a corner of two walls;

numeral 70 denotes a prior art master-piece duplicating machine;

numerals 72 and 74 denote vices, for securing the work-piece and the master-piece;

numerals 78A and 78B denote securing assemblies; each of them is disposed on another point of a protrusion, which is to be inserted in the channel of the prior art table saw;

numeral 80 denotes the table of the prior art table saw;

numerals 82A and 82B denote points of the cutting blade; and numeral 86 denotes a cut.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A machining device, comprising:
   a cart, for carrying a master-piece and a work-piece;
   a first rail, for allowing manual sliding of said cart along said first rail;
   a first vice for securing the master-piece, said first vice being fixed to said movable cart;
   a second vice for securing the work-piece, said second vice being fixed to said movable cart;
   a limiting element, for limiting said manual sliding of said cart upon meeting of the master-piece with said limiting element; and
   a protrusion comprising at least two points extending downwards from said first rail, for connecting said first rail to a table saw, parallel to a cutting blade of the table saw, in a removable manner, said protrusion being shaped for inserting thereof into a channel of a table of the table saw,
   wherein at least one of said at least two points extending downwards from said first rail comprises a securing assembly characterized for securing said protrusion of said machining device to said channel of the table saw, said securing assembly comprising an eccentric lump, for allowing it to protrude from said protrusion upon rotating said eccentric lump, thereby pressing said protrusion towards a wall of said channel, thereby said pressing provides friction force between said protrusion and said channel for securing one to the other,
   thereby said manual sliding of said cart along said first rail moves the master-piece the work-piece parallel to the cutting blade,
   thereby said limiting of said manual sliding by said limiting element of said machining device, allows the cutting blade of said table saw to cut the work-piece while duplicating the master-piece,
   thereby said machining device utilizes parallelism between the channel and the cutting blade of the table saw in that upon applying said inserting, said manual sliding of said cart along said first rail moves the master-piece and the work-piece parallel to the cutting blade.

2. A machining device according to claim 1, further comprising:
   a second rail being disposed perpendicularly to said first rail, for allowing sliding said cart perpendicularly to said first rail,
   thereby allowing moving the work-piece perpendicular to the cutting blade, for cutting, thereby allowing coping the work-piece.

3. A machining device according to claim 1, wherein said securing assembly is characterized in allowing said securing of said protrusion of said machining device to said channel of the table saw in various locations along said channel.

4. A machining device, comprising:
   a cart, for carrying a master-piece and a work-piece;
   a first rail, for allowing manual sliding of said cart along said first rail;
   a first vice for securing the master-piece, said first vice being fixed to said movable cart;
   a second vice for securing the work-piece, said second vice being fixed to said movable cart;
   a limiting element, for limiting said manual sliding of said cart upon meeting of the master-piece with said limiting element; and
   a protrusion comprising at least two points extending downwards from said first rail, for connecting said first rail to a table saw, parallel to a cutting blade of the table saw, in a removable manner, said protrusion being shaped for inserting thereof into a channel of a table of the table saw,
   wherein at least one of said at least two points extending downwards from said first rail comprises a securing assembly characterized for securing said protrusion of said machining device to said channel of the table saw, wherein said securing assembly comprises a screw for operating said securing assembly, said screw being disposed above said first rail, for being accessible,
   thereby said manual sliding of said cart along said first rail moves the master-piece the work-piece parallel to the cutting blade,
   thereby said limiting of said manual sliding by said limiting element of said machining device, allows the cutting blade of said table saw to cut the work-piece while duplicating the master-piece,
   thereby said machining device utilizes parallelism between the channel and the cutting blade of the table saw in that upon applying said inserting, said manual sliding of said cart along said first rail moves the master-piece and the work-piece parallel to the cutting blade.

5. A method for producing a master-piece duplicating machine, the method comprising the steps of:
   a) providing a machining device comprising:
      a cart;
      a rail, for allowing manual sliding of said cart along said rail;
      a first vice for securing a master-piece, said first vice being fixed to said movable cart;
      a second vice for securing a work-piece, said second vice being fixed to said movable cart; and
      a limiting element, for limiting said manual sliding of said cart upon meeting of the master-piece with said limiting element; and
      connecting means; and b) connecting, by said connecting means, said rail to a table saw, parallel to a cutting blade of the table saw, in a removable manner by inserting a protrusion extending downwards from said rail of said machining device into a channel of a table of a table saw, thereby said manual sliding of said cart along said rail moves the master-piece and the work-piece parallel to the cutting blade, thereby said limiting of said manual sliding by said limiting element of said machining device, allows the cutting blade of said table saw to cut the work-piece while duplicating the master-piece, and thereby utilizing parallelism between the channel and the cutting blade of the table saw in that upon applying said inserting, said manual sliding of said cart along said rail moves the master-piece and the work-piece parallel to the cutting blade.

6. A method according to claim 5, further comprising the step of: securing said protrusion of said machining device to said channel of the table saw.

\* \* \* \* \*